United States Patent [19]

Okita

[11] Patent Number: 4,873,138
[45] Date of Patent: Oct. 10, 1989

[54] METALLIC THIN FILM TYPE MAGNETIC RECORDING MEDIUM

[75] Inventor: Tsutomu Okita, Kanagawa, Japan

[73] Assignee: Fuji Photo Film Co., Ltd., Kanagawa, Japan

[21] Appl. No.: 309,327

[22] Filed: Oct. 18, 1988

Related U.S. Application Data

[63] Continuation of Ser. No. 90,382, Aug. 27, 1987, abandoned, which is a continuation of Ser. No. 757,581, Jul. 22, 1985, abandoned, which is a continuation of Ser. No. 582,666, Feb. 23, 1984, abandoned.

[30] Foreign Application Priority Data

Feb. 24, 1983 [JP] Japan .................. 58-28644

[51] Int. Cl.$^4$ .............................. G11B 5/64
[52] U.S. Cl. ...................... 428/336; 427/34; 427/39; 427/131; 427/132; 428/694; 428/695; 428/900
[58] Field of Search ............ 428/694, 695, 900, 422, 428/421, 336; 427/39.34, 40, 130–132

[56] References Cited

U.S. PATENT DOCUMENTS

| | | | |
|---|---|---|---|
| 4,013,532 | 3/1977 | Cormia et al. ................ | 427/41 |
| 4,188,426 | 2/1980 | Auerbach .................... | 427/40 |
| 4,188,434 | 2/1980 | Loran ......................... | 427/426 |
| 4,252,848 | 2/1981 | Datta et al. .................. | 428/422 |
| 4,267,238 | 5/1981 | Chernega .................... | 428/422 |
| 4,268,556 | 5/1981 | Pedrotty ..................... | 428/422 |
| 4,368,239 | 1/1983 | Nakajima et al. ............ | 427/131 |
| 4,391,843 | 7/1983 | Kaganowicz et al. ........ | 427/40 |
| 4,419,404 | 12/1983 | Arai et al. ................... | 428/421 |
| 4,429,024 | 1/1984 | Ueno et al. .................. | 428/694 |
| 4,486,500 | 12/1984 | Naruo et al. ................. | 428/695 |
| 4,495,242 | 1/1985 | Arai et al. ................... | 428/695 |
| 4,521,482 | 6/1985 | Arai et al. ................... | 428/695 |
| 4,529,651 | 7/1985 | Kitoo et al. ................. | 427/131 |
| 4,548,864 | 10/1985 | Nakayama et al. ........... | 428/694 |
| 4,551,778 | 11/1985 | Arai et al. ................... | 428/695 |
| 4,581,245 | 4/1986 | Nakamura et al. ........... | 427/131 |

FOREIGN PATENT DOCUMENTS 47764 4/1979 Japan ..................... 427/40
160828 9/1984 Japan .

OTHER PUBLICATIONS

Bradley et al., "Prospects for Industrial Applications of Electrical Discharge", Chem Tech, Apr. 1971, p. 232.

Primary Examiner—Paul J. Thibodeau
Attorney, Agent, or Firm—Sughrue, Mion, Zinn, Macpeak & Seas

[57] ABSTRACT

A magnetic recording medium with a magnetic thin film as a magnetic recording layer is described. The medium is comprised of a polymer support, a ferromagnetic metal thin film on the support, a plasma polymerization layer 20 to 270 Å in thickness on the thin film, and a lubricating layer on the plasma polymerization layer. The lubricating layer is made of at least one member selected from compounds having a carbon-carbon unsaturated group at the terminal thereof and containing at least 8 carbon atoms. This magnetic recording medium is superior in corrosion protection, running properties, and durability, and moreover, has good electromagnetic properties.

28 Claims, 1 Drawing Sheet

METALLIC THIN FILM TYPE MAGNETIC RECORDING MEDIUM

This is a continuation, of application Ser. No. 07/090,382, filed Aug, 27, 1987, now abandoned which is a continuation of application Ser. No. 06/757,581 filed July 22, 1985, now abandoned which is a continuation of 06/582,666 filed Feb. 23, 1984, now abandoned.

FIELD OF THE INVENTION

The present invention relates to a magnetic recording medium with a magnetic thin film as a magnetic recording layer. More particularly, the present invention relates to a metallic thin film type of magnetic recording medium superior in corrosion resistance, electromagnetic properties, running properties, and abrasion resistance.

BACKGROUND OF THE INVENTION

A magnetic recording medium of the so-called coating type that a binder with ferrogmagnetic powder dispersed therein is coated on a non-magnetic support has heretofore been in widespread use. Recently, however, with the increasing requirements of high density recording, a metallic thin film type of magnetic recording medium with a ferromagnetic metallic thin film as a magnetic recording layer, said ferromagnetic metallic thin film being formed by a vapor deposition method, such as vacuum deposition, sputtering and ion plating, or a plating method, such as electric plating and non-electric plating, has received attention and has been put into practical use.

This metallic thin film type of magnetic recording medium is very advantageous in electromagnetic properties since a ferromagnetic metal of high saturation magnetization can be formed into a very thin layer without the use of a non-magnetic substance, such as a binder, and thus it is suitable for high density recording.

The metallic thin film type of magnetic recording medium, however, suffers from the serious problem that the metallic surface is corroded with the lapse of time after the production thereof, resulting in a reduction of electromagnetic properties.

Various methods have been proposed to solve the foregoing problem. One method is to provide a protective layer on the metallic surface by coating with thermoplastic or thermosetting polymers, as described in W. German Patent Application (OLS) Nos. 220964 and 322006, British Patent Application 2106011A and Japanese Patent Application (OPI) Nos. 50128/83 and 158037/82. (The term "OPI" as used herein means a "published unexamined Japanese patent application".) This method, however, fails to provide sufficient corrosion resistance since the thickness of the protective layer cannot be increased because of the spacing loss between a head and the magnetic layer (see FIG. 2). In addition, a method of nitriding the surface of the magnetic layer (see Japanese Patent Application (OPI) No. 33806/75) and a method of oxidizing the surface (see Japanese Patent Publication No. 20025/67) are known. However, the time required for these methods is as long as 10 minutes to 2 hours; if the time of treatment is shortened, no sufficient anticorrosion effect can be obtained.

Another serious problem of the metallic thin film type of magnetic recording medium is that running properties and durability are poor; the magnetic recording medium sticks to a running path during running, preventing smooth running or sometimes causing the running to stop, or the still durability is poor.

As a method to overcome the foregoing problem, it has been considered to coat the ferromagnetic metal thin film with thermoplastic or thermosetting polymers, or lubricants such as aliphatic acids and aliphatic acid esters, as described in Japanese Patent Application (OPI) Nos. 68930/81 and 80827/81. Even when this method is employed, the running properties are sometimes improved only insufficiently, or the durability is also sometimes improved insufficiently. In order to ensure sufficiently satisfactory running properties and durability, it is inevitably necessary to increase the thickness of the coating layer. This will lead to the spacing loss and finally to deterioration of electromagnetic properties. It is also necessary to increase the thickness of the coating layer so that sufficiently satisfactory corrosion protection can be obtained. This is also not preferred for electromagnetic properties.

SUMMARY OF THE INVENTION

An object of the invention is to provide a metallic thin film type of magnetic recording medium having a protective layer which is greatly reduced in thickness so that the spacing loss between a head and a magnetic layer can be minimized, and moreover which is very good in all of corrosion protection, running properties, and durability.

The object can be attained by employing a protective layer comprising a plasma polymerization layer having a thickness of from 20 to 270 Å and a lubricating layer on the plasma polymerization layer, said lubricating layer being made of at least one compound selected from the group consisting of compounds having a carbon-carbon unsaturated group at the terminal and containing at least 8 carbon atoms.

The present invention relates to a magnetic recording medium comprising a polymer support, a ferromagnetic metal thin film on the polymer support, a plasma polymerization layer 20 to 270 Å in thickness on the thin film, and a lubricating layer on the plasma polymerization layer, said lubricating layer being made of at least one member of compounds having a carbon-carbon unsaturated group at the terminal and containing at least 8 carbon atoms.

DETAILED DESCRIPTION OF THE INVENTION

Figure 1:
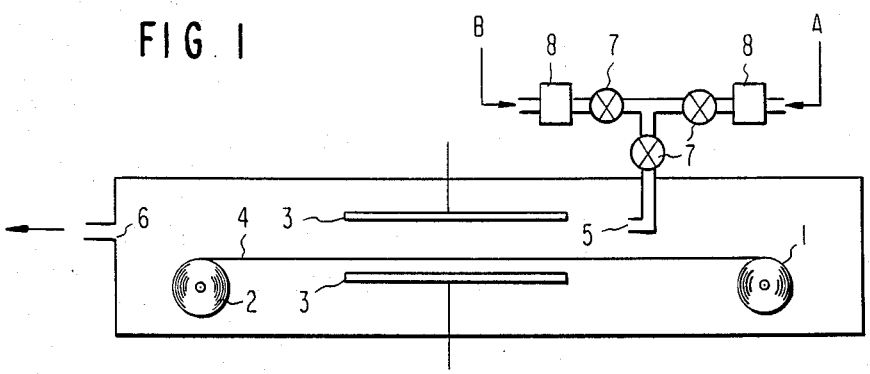
FIG. 1 illustrates schematically a plasma polymerization apparatus of inner electrode type.
Figure 2:
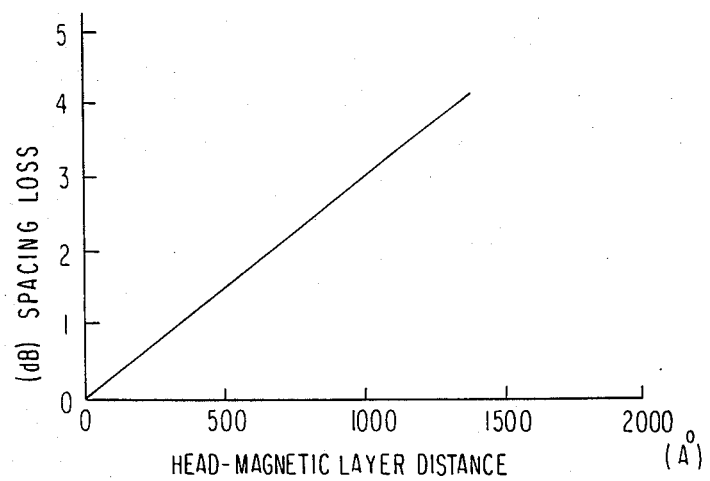
FIG. 2 shows the relationship between the headmagnetic layer distance and the spacing loss.

The plasma polymerization layer of the invention has a dense cross-linked structure; that is, it is formed on the metallic thin film as a layer which is very dense and is uniform in thickness. In this respect, the plasma polymerization layer of the invention is different from the usual polymer layers. Because of this structure, the plasma polymerization layer effectively prevents oxygen, water, etc., which are responsible for corrosion, from coming into contact with the metallic thin film, or does not allow them to pass therethrough, and thus it is superior in corrosion protection. Moreover, since the plasma polymerization layer can be formed as a very thin layer, the spacing loss between the head and magnetic layer can be minimized. This permits the production of a magnetic recording medium having good electromagnetic properties. By provision of the plasma polymerization layer alone, however, it is not possible to obtain a magnetic recording medium having sufficiently satisfactory running properties and durability.

Astonishingly it has been found that a magnetic recording medium having good electromagnetic properties and superior in all the corrosion protection, running properties and durability can be obtained by providing a lubricating layer made of a certain kind of compound on the plasma polymerization layer. Suitable compounds have been found to be those having a carbon-carbon unsaturated bond at the terminal and containing at least 8 carbon atoms (these compounds are hereinafter sometimes referred to merely as "monomers"). Production of such superior magnetic recording media is considered due to the formation of the lubricating layer which is strongly bound onto the plasma polymerization layer by the reaction of radical active sites generated by the plasma polymerization and the carbon-carbon unsaturated bonds.

An advantage of the present invention is that after the formation of the plasma polymerization layer the lubricating layer can be provided thereon by a method of passing through a monomer gas atmosphere or a method of spraying a monomer gas; that is, the lubricating layer can be provided without using any solvent at all. In accordance with these methods, the operation is simplified, and additional equipments such as drying zone are not needed. Moreover, if the method is performed in combination with the vapor deposition method whereby the metallic thin film is formed in a vacuum by vapor deposition, for example, the metallic thin film and the protective layer can be formed successively in the same line without breaking the vacuum atmosphere. This is advantageous with respect to equipment and economy.

Compounds (hereinafter referred to as "low molecular compounds") to be used in the formation of the plasma polymerization layer include those having a vapor pressure at 20° C. and $10^{-4}$ torr. Preferred compounds have a boiling point of 200° C. or less, preferably 100° C. or less and more preferably 0° C. or less. Preferred examples are given below although the present invention is not intended to be limited thereto.

(i) Aliphatic saturated hydrocarbons such as methane, ethane, propane, butane, pentane, hexane, and octane;

(ii) Aliphatic unsaturated hydrocarbons such as ethylene, propylene, butene, and hexene;

(iii) Aromatic hydrocarbons such as benzene, toluene, xylene, styrene, and ethylbenzene;

(iv) Saturated or unsaturated halogeno compounds such as fluoromethane, difluoromethane, trifluoromethane, tetrafluoromethane, difluoroethane, tetraluoroethylene, hexafluoropropylene, tetrafluorosilane, dichloroethylene, and tetrachloroethane;

(v) Alcohols such as methanol, ethanol, and trifluoromethanol;

(vi) Ketones such as acetone, and methyl ethyl ketone;

(vii) Ethers such as dimethyl ether, methyl ethyl ether, and diethyl ether; and (viii) Aliphatic acids such as formic acid.

Of these, the compounds (i)–(iv) are particularly preferred. These compounds can be used singly or in combination with each other.

The apparatus for use in plasma polymerization (glow discharge polymerization) may be of the non-electrode discharge type or of the electrode discharge type. In addition, an inner electrode type apparatus in which electrodes are placed inside the reaction vessel, and an outer electrode type apparatus in which the electrodes are provided outside the reaction vessel can be used. Moreover, a method of introducing a low molecular compound gas into an after-glow (see Thompson et al, *J. Appln. Poly. Sci.*,16, 2291 (1972) can be employed. Particularly preferred is a method of introducing a low molecular compound gas into the after-glow utilizing the inner electrode type apparatus (as shown in FIG. 1) since stable plasma can be easily obtained.

Referring to FIG. 1, there is shown an inner electrode type plasma polymerization apparatus suitable for use in the formation of the plasma polymerization layer of the invention. This polymerization apparatus comprises a vacuum apparatus (polymerization vessel), a film-feeding unit 1 and a film-winding unit 2 which are placed in the vacuum apparatus, and a pair of electrode plates 3, which are arranged so that a plasma polymerization layer can be formed on a film 4 comprising a polymer support and a ferromagnetic metal thin film provided thereon while passing it therebetween continuously. A cooling means such as cooling rolls (not shown) may be provided in the polymerization apparatus to prevent deformation of the tape due to the increase of temperature during the plasma polymerization. The temperature in the polymerization temperature is a room temperature (10 to 50° C.). The distance of the electrode plates 3 is not particularly limited but generally from 10 to 50 mm. In the first place, the vacuum apparatus is evacuated to a suitable degree of vacuum by means of a vacuum pump (not shown) through an outlet 6. Then a low molecular compound gas A is introduced into the vacuum apparatus under a suitable pressure through a gas inlet 5 after being passed through a flowmeter 8 and a valve 7. If necessary, an inert gas B can be introduced in combination through the flowmeter 8 and the valve 7 as in the low molecular compound gas A.

The pressure of the low molecular compound gas in the polymerization vessel is preferably between 1 and $1\times10^{-4}$ Torr and more preferably between $1\times10^{-1}$ and $5\times10^{-3}$ Torr. If the pressure is higher than the above upper limit, the plasma polymerization layer is formed in the form of powder, or the inside of the polymerization vessel is contaminated. On the other hand, if the pressure is lower than the lower limit, a long period of time is undesirably taken for the formation of the plasma polymerization layer. If necessary, an inert gas, such as nitrogen and argon, can be introduced in the polymerization vessel. The mixing rate of the low molecular weight compound gas to the inert gas is preferably 1% or more, more preferably 5% or more.

The oscillation frequency of plasma is not critical and generally from 100 Hz to 20 MHz, and it is conveniently 13.56 MHz. Further, the electric power for the plasma polymerization is generally from 10 to 500 watt. If it is too high, the resulting polymerization tends to be granular and if it is too low, the polymerization efficiency decreases.

The thickness of the plasma polymerization layer is preferably from 20 to 270 Å and more preferably from 50 to 200 Å. If the thickness of the plasma polymerization layer is increased beyond the above upper limit, the spacing loss between the head and the magnetic layer is undesirably increased. On the other hand, if it is lower than the lower limit, the corrosion protection is reduced, and the tolerance ranges for plasma polymerization conditions are narrowed.

The plasma polymerization layer of the invention preferably has a density of at least 1.1 g/cm$^3$, more preferably 1.4 g/cm$^3$ or more, although the invention is not limited thereto. The density as used herein is determined by a density-gradient tube with n-hexane and tetrachloromethane using a powder of the plasma polymerization layer as obtained by scraping therefrom. The density-gradient tube method is described in Bernhard Wunderlich, *Macromolecular Physics* 1, Academic Press pp. 382–383 (1973).

Monomers for use in the formation of the lubricating layer of the invention have a carbon-carbon unsaturated group at the terminal thereof and contain 8 to 30 carbon atoms, preferably 10 to 24 carbon atoms. These monomers can be used singly or in combination with each other. More preferred monomers are those having a carbon-carbon unsaturated group at the terminal thereof and containing 12 to 18 carbon atoms.

Among these, preferred compounds are aliphatic unsaturated hydrocarbons containing a carbon-carbon unsaturated group at the terminal thereof, or compounds resulting from partial substitution of the hydrogens of the aliphatic unsaturated hydrocarbons with fluorine; esters of unsaturated aliphatic alochols containing a carbon-carbon unsaturated group at the terminal thereof and fatty acids, or compounds resulting from partial substitution of the hydrogens of the esters with fluorine; and esters of unsaturated fatty acids containing a carbon-carbon unsaturated group at the terminal thereof and aliphatic alcohols, or compounds resulting from partial substitution of the hydrogens of the esters with fluorine, provided that the number of carbon atoms in each molecule is at least 8. Preferred examples are 1-octene, 1-decene, 1-dodecene, 1-tetradecene, 1-pentadecene, 1-octadecene, 1-eicosene, 2,4-dimethyl-1-heptene, vinyl caprylate, vinyl laurate, vinyl myristate, vinyl palmitate, vinyl stearate, allyl laurate, allyl oleate, decyl acrylate, dodecyl acrylate, tetradecyl acrylate, octadecyl acrylate, tetradecyl methacrylate, hexyl-4-pentenate, and compounds prepared by replacing all or some of the hydrogens of the above compounds with fluorine. Of these, 1-dodecene, vinyl laurate, vinyl caprylate, decyl acrylate and those prepared by replacing all or some of the hydrogens with fluorine.

After the formation of the plasma polymerization layer, the lubricating layer is provided thereon, for example, by the following techniques:

(1) a method of spraying the monomer in a gaseous state (gaseous monomer concentration: preferably 0.1 to 10%) under atmospheric pressure:

(2) a method of bringing the plasma polymerization layer into contact with a monomer gas (gas pressure: preferably 0.01 to 10 Torr) under reduced pressure, wherein an inert gas such as nitrogen and argon may be introduced together and the contact time is preferably 1 to 30 seconds per a point of the plasma polymerization layer.

(3) a method of coating the monomer as such or after diluting with organic solvents having a boiling point of 120° C. or less (e.g., acetone, methyl ethyl ketone, hexane, ethyl acetate, etc.) preferably to the concentration of 0.01 to 10 wt%, wherein the coated amount is preferably 0.5 to 50 mg/m$^2$ (monomer).

Of these methods, Method (2) above is most advantageous, and it can provide a lubricating layer which is very thin and possesses good running properties. The thickness of the lubricating layer is 1 to 100 Å and preferably 5 to 30 Å.

It is not always required for the lubricating layer of the invention to have a uniform layer structure, particularly in method (3).

Polymer supports which can be used include cellulose acetate, cellulose nitrate, ethyl cellulose, methyl cellulose, polyamides, polymethyl methacrylate, polytetrafluoroethylene, polytrifluoroethylene, homo- and co-polymers of α-olefins such as ethylene and propylene, homo- and copolymers of vinyl chloride, polyvinylidene chloride, polycarbonates, polyimides, polyamidoimides, and polyesters such as polyethylene terephthalate and polyethylene naphthalate. Of these, polyamides, polyimides, polyethylene terephthalate and polyethylene naphthalate are preferably used.

The ferromagnetic metal thin film of the invention is formed by vapor deposition or plating. The vapor deposition method is a procedure in which a substance or compound to be formed into a thin film is generated or introduced as a vapor or ionized vapor into an atmosphere of an inert gas or gases such as oxygen, or a vacuum and, thereafter, is deposited as a film on a desired support. The vapor deposition method includes a vacuum deposition method, a sputtering method, an ion plating method, an ion beam deposition method, and a chemical gas phase plating method. The plating method is a procedure in which the substance is formed as a thin film on the support from a liquid phase, such as an electric plating method and a non-electrolytic plating method. These methods are described in U.S. Patents 4,287,225, 3,438,885 and 3,843,420.

Materials which can be used in the formation of ferromagnetic metal thin film include ferromagnetic metals such as Fe, Co and Ni and their alloys, and Fe-Si, Fe-Rh, Fe-V, Fe-Ti, Co-P, Co-B, Co-Si, Co-V, Co-Y, Co-Sm, Co-Mn, Co-Ni-P, Co-Ni-B, Co-Cr, Co-Ni-Cr, Co-Ni-Ag, Co-Ni-Pd, Co-Ni-Zn, Co-Cu, Co-Ni-Cu, Co-W, Co-Ni-W, Co-Mn-P, Co-Sm-Cu, Co-Ni-Zn-P, Co-V-Cr, etc. Particularly preferably the ferromagnetic metal thin film contains at least 50% by weight of Co.

The thickness of the ferromagnetic thin film for the magnetic recording medium of the invention is generally from 0.02 to 5 μm and preferably from 0.05 to 2 μm. The thickness of the polymer support is preferably from 4 to 50 μm. In order to increase the adhesion of the ferromagnetic metal thin film and to improve the magnetic characteristics thereof, an undercoating layer may be provided on the polymer support. A back coat layer may be provided on the polymer support at the opposite side to the magnetic layer.

The magnetic recording medium of the invention may take any form of, e.g., a tape, a sheet, a card, and a disc. It is particularly preferred for the magnetic recording medium to be in the form of a tape.

The present invention is described in greater detail with reference to the following Examples and Comparative Examples, although it is not intended to be limited thereto. All parts are by weight.

A film member comprising a 12 μm thick polyethylene terephthalate film and a Co-Ni magnetic film (Ni: 20% by weight: film thickness: 1,000 Å) provided on the polyethylene terephthalate film by slant vacuum deposition was used in the following experiment.

A plasma polymerization layer was provided on the film member by the following methods:

(1) In the apparatus shown in FIG. 1, plasma polymerization was performed under such conditions that the ratio of $CH_4$ gas to $N_2$ gas was 1/10, the pressure of $CH_4$ gas was $9.1'10^{-4}$ Torr, the pressure in the polymerization vessel was $1 \times 10^{-2}$ Torr, and the residence time between the electrodes at 50 Watts was 10 seconds. The thickness of plasma polymerization layer was 100 Å. This is designated as "Sample No. 1".

(2) In the apparatus shown in FIG. 1, plasma polymerization was performed under such conditions that the ratio of $CF_2\!=\!CF_2$ gas to $N_2$ gas was 1/10, the pressure of $CF_2\!=\!CF_2$ gas was $4.5 \times 10^{-4}$ Torr, the pressure in the polymerization vessel was $5 \times 10^{-3}$ Torr, and the residence time between the electrodes at 50 watts was 10 seconds. The thickness of plasma polymerization layer was 100 Å. This is designated as "Sample No. 2".

EXAMPLE 1

After the formation of the plasma polymerization layer for Sample No. 1, plasma discharging was stopped. The pressure in the polymerization vessel was adjusted to 1 Torr using 1-dodecene and the sample was re-wound. The time for which the sample was exposed to 1-dodecene during re-winding was set at 10 seconds. This is designated as "Sample No. 3".

EXAMPLE 2

Sample No. 1 was taken out at atmospheric pressure and re-wound while spraying vinyl laurate by means of an air jet. This is designated as "Sample No. 4".

EXAMPLE 3

Sample No. 1 was taken out in the air. Thereafter, it was again placed in the apparatus shown in FIG. 1 and re-wound in an atmosphere of $CH_2CHCO_2(CF_2)_9CF_3$ under a pressure of 0.5 Torr in such a manner that the exposing time was 10 sesconds. This is designated as "Sample No. 5".

EXAMPLE 4

Sample No. 2 was taken out at atmospheric pressure, and it was then coated with a 0.1% solution of 1-tetradecene in methyl ethyl ketone. This is designated as "Sample No. 6".

COMPARATIVE EXAMPLES 1 AND 2

Sample Nos. 1 and 2 were evaluated as such.

COMPARATIVE EXAMPLE 3

A 0.1% solution of palmitic acid is methyl ethyl ketone was coated on Sample No. 1 to obtain Sample No. 7.

COMPARATIVE EXAMPLE 4

A 0.1% solution of a vinyl chloride-vinyl acetate copolymer in methyl ethyl ketone was coated on the film member and dried without application of plasma polymerization to obtain Sample No. 8.

COMPARATIVE EXAMPLE 5

The film member prior to the application of plasma polymerization was evaulated. This is designated as "Sample No. 9".

COMPARATIVE EXAMPLE 6

Sample No. 8 was exposed to 1-dodecene under a pressure of 1 Torr for 10 seconds to obtain Sample No. 10.

EXAMPLE 5

Samples Nos. 11 to 15 were prepared in the same manner as in Example 1 except that film members prepared using varied residence times between the electrodes as shown below were used.

| Residence Time (seconds) | Sample No. |
|---|---|
| 50 | 11 |
| 25 | 12 |
| 5 | 13 |
| 2 | 14 |
| 1 | 15 |

Sample Nos. 1 to 15 were subjected to the testings as described below. The results are shown in Table 1.

1. Corrosion Protection

Each sample was allowed to stand at 60° C. and 80% RH for 7 days. At the end of the time, corrosion was examined with the naked eye.

2. Running Properties

Each sample was slit to ½ inch width and mounted on a home video tape recorder ("NV 8310", produced by Matsushita Denki Sangyo Co., Ltd.). Tension, $T_1$, at the inlet side of the rotary cylinder and tension, $T_2$, at the outlet side were measured at 23° C. and 65% RH.

$\mu$ was calculated from the following equation:

$$T_2/T_1 = e \times p(\mu\pi)$$

3. Durability

The still durability (minutes) was determined at 23° C. and 65% RH by the use of a home video tape recorder ("Model 3600", produced by Victor Co., Ltd.).

4. Measurement of Thickness

The thickness was measured by the use of a quartz crystal oscillator. In the case of those samples having a too small thickness, the web speed was decreased to increase the thickness to at least 1,000 Å, and the residence time between electrodes was calculated. The total thickness of the protective and lubricating layers on the metal thin film magnetic layer is given in Table 1. The symbol (*) indicates that the value is calculated from the plasma polymerization time.

TABLE 1

| Sample No. | Corrosion Protection | Running Properties | Durability (min) | Thickness Å |
|---|---|---|---|---|
| 1 | No change | 0.5 or more | 30 or more | 100 |
| 2 | No change | 0.5 or more | 30 or more | 100 |
| 3 | No change | 0.15 | 30 or more | 120 |
| 4 | No change | 0.14 | 30 or more | 130 |
| 5 | No change | 0.15 | 30 or more | 120 |
| 6 | No change | 0.17 | 30 or more | 130 |
| 7 | No change | 0.18 | 10 | 130 |
| 8 | White turbidity is locally formed (the white turbid area is 50% of the total area). | 0.45 | 5 | 500 |
| 9 | The entire surface becomes white turbid | 0.5 or more | 1 or less | 0 |
| 10 | White turbidity is locally formed (the white turbid | 0.45 | 5 | 500 |

TABLE 1-continued

| Sample No. | Corrosion Protection | Running Properties | Durability (min) | Thickness Å |
|---|---|---|---|---|
| | area is 40% of the total area). | | | |
| 11 | No change | 0.15 or more | 30 or more | 500 |
| 12 | No change | 0.14 | 30 or more | 300 |
| 13 | No change | 0.14 | 30 or more | 50* |
| 14 | No change | 0.13 | 30 or more | 20* |
| 15 | White turbidity is locally formed (the white turbid area is 30% of the total area). | 0.14 | 10 | 10* |

It can be seen from the results shown in Table 1 that the magnetic recording media of the present invention are superior in corrosion protection, running properties and durability, produce only a reduced spacing loss, and have good electromagnetic properties. More over it can be seen that the methods described in Examples 1 and 5 are advantageous methods which make it possible to conduct the formation of the metallic thin film magnetic layer and the formation of the plasma polymerization layer in the same line.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising:
   a polymer support base;
   a ferromagnetic metal thin film on the polymer support base;
   a plasma polymerization layer having a thickness of 20 to 270 Å as provided on the ferromagnetic metal thin film by plasma polymerization of a gaseous low molecular compound at a pressure of the gaseous low molecular compound of from 1 to $1 \times 10^{-4}$ Torr; and
   a lubricating layer on the plasma polymerization layer, wherein said lubricating layer is formed from a compound which has a carbon-carbon unsaturated group at a terminal position thereof and contains at least 8 carbon atoms, and being strongly bound onto the plasma polymerization layer after plasma polymerization by reaction of radical active sites generated by the plasma polymerization and the carbon-carbon unsaturated bonds.

2. A magnetic recording medium as claimed in claim 1, wherein the plasma polymerization layer is formed of a compound having a boiling point of 200° C. or less.

3. A magnetic recording medium as claimed in claim 2, wherein the plasma polymerization layer has a thickness in the range of 50 to 200 Å.

4. A magnetic recording medium as claimed in claim 3, wherein the plasma polymerization layer has a density of 1.4 g/cm$^3$ or more.

5. A magnetic recording medium as claimed in claim 1, wherein the lubricating layer is comprised of a compound having 8 to 30 carbon atoms.

6. A magnetic recording medium as claimed in claim 5, wherein the lubricating layer has a thickness in the range of 1 to 100 Å.

7. A magnetic recording medium as claimed in claim 1, wherein the ferromagnetic metal thin film is comprised of 50% by weight or more of cobalt.

8. A magnetic recording medium as claimed in claim 7, wherein the ferromagnetic metal thin film has a thickness in the range of 0.02 to 5 μm.

9. A magnetic recording medium as claimed in claim 7, wherein the metal thin film has a thickness in the range of 0.05 to 2 μm.

10. A magnetic recording medium as claimed in claim 1, wherein the plasma polymerization layer is formed at a pressure of between 1 and $5 \times 10^{-3}$ Torr.

11. A magnetic recording medium as claimed in claim 1, wherein said compound having a carbon-carbon unsaturated group at a terminal position thereof is selected from the group consisting of 1-octene, 1-decene, 1-dodecene, 1-tetradecene, 1-pentadecene, 1-octadecene, 1-eicosene, 2,4-dimethyl-1-heptene, vinyl caprylate, vinyl laurate, vinyl myristate, vinyl palmitate, vinyl stearate, allyl laurate, allyl oleate, decyl acrylate, dodecyl acrylate, tetradecyl acrylate, octadecyl acrylate, tetradecyl methacrylate, hexyl-4-pentenate, and compounds prepared by replacing all or some of the hydrogens of these compound with fluorine.

12. A magnetic recording medium as claimed in claim 1, wherein said compound having a carbon-carbon unsaturated group at a terminal position thereof is selected from the group consisting of 1-dodecene, vinyl laurate, vinyl caprylate, decyl acrylate and those prepared by replacing all or some of the hydrogens of these compounds with fluorine.

13. A magnetic recording medium as claimed in claim 1, wherein the low molecular compound has a vapor pressure at 20° C. of $10^{-4}$ Torr.

14. A magnetic recording medium as claimed in claim 13, wherein the low molecular compound is selected from the group consisting of aliphatic saturated hydrocarbons, aliphatic unsaturated hydrocarbons, aromatic hydrocarbons, saturated or unsaturated halogeno compounds, alcohols, ketones, ethers and aliphatic acids.

15. A magnetic recording medium as claimed in claim 14, wherein the low molecular compound is selected from the group consisting of the aliphatic saturated hydrocarbons.

16. A magnetic recording medium as claimed in claim 14, wherein the low molecular compound is selected from the group consisting of the aliphatic unsaturated hydrocarbons.

17. A magnetic recording medium as claimed in claim 14, wherein the low molecular compound is selected from the group consisting of the aromatic hydrocarbons.

18. A magnetic recording medium as claimed in claim 14, wherein the low molecular compound is selected from the group consisting of the saturated or unsaturated halogeno compounds.

19. A magnetic recording medium as claimed in claim 1, wherein the plasma polymerization is carried out in the presence of an inert gas at a mixing rate of the gaseous low molecular compound to the inert gas of 5% or more.

20. A magnetic recording medium as claimed in claim 1, wherein the compound which forms the lubricating layer is a monomer, and the lubricating layer is formed after the formation of the plasma polymerization layer by spraying the monomer in a gaseous state under atmospheric pressure.

21. A magnetic recording medium as claimed in claim 20, wherein the gaseous monomer concentration is 0.1 to 10%.

22. A magnetic recording medium as claimed in claim 1, wherein the compound which forms the lubricating layer is a monomer and the lubricating layer is formed after the formation of the plasma polymerization layer by bringing the plasma polymerization layer into contact with the monomer in gaseous form under reduced pressure.

23. A magnetic recording medium as claimed in claim 22, wherein the gas pressure is 0.1 to 10 Torr.

24. A magnetic recording medium as claimed in claim 22, wherein the monomer in gaseous form is brought into contact with the plasma polymerization layer in combination with an inert gas.

25. A magnetic recording medium as claimed in claim 22, wherein the contact time is 1 to 30 seconds for a point of the plasma polymerization layer.

26. A magnetic recording medium as claimed in claim 22, wherein the compound which forms the lubricating layer is a monomer, and the lubricating layer is provided on the plasma polymerization layer after formation of the plasma polymerization layer by coating the monomer on the plasma polymerization layer.

27. A magnetic recording medium as claimed in claim 26, wherein the monomer is diluted with an organic solvent having a boiling point of 120° C. or less.

28. A magnetic recording medium as claimed in claim 1, wherein the concentration of the monomer is 0.1 to 10 wt% and the coated amount is 0.5 to 50 mg/m$^2$.

* * * * *